May 20, 1969    STEN-ERIC SVENSSON ET AL    3,444,758

VEHICLE BRAKE LINKAGE SLACK-ADJUSTER

Filed Feb. 1, 1968

INVENTORS
Sten-Eric Svensson
Kaj Anders Lilja

BY Laurence R. Brown
ATTORNEY

United States Patent Office 3,444,758
Patented May 20, 1969

3,444,758
VEHICLE BRAKE LINKAGE SLACK-ADJUSTER
Sten-Eric Svensson and Kaj Anders Lilja, Malmo, Sweden, assignors to Svenska Aktiebolaget Bromsregulator, Malmo, Sweden
Filed Feb. 1, 1968, Ser. No. 702,304
Claims priority, application Great Britain, Feb. 28, 1967, 9,329/67
Int. Cl. G05g 1/12
U.S. Cl. 74—559     3 Claims

ABSTRACT OF THE DISCLOSURE

A brake linkage slack-adjuster permits heavier loading by providing teeth on a worm gear meshing with teeth on a worm wheel wherein the teeth have unsymmetric profiles resulting in a profile angle with a plane normal to the axis of the worm gear smaller when a brake force is being transmitted than when no brake force is being transmitted.

---

Figure 1:
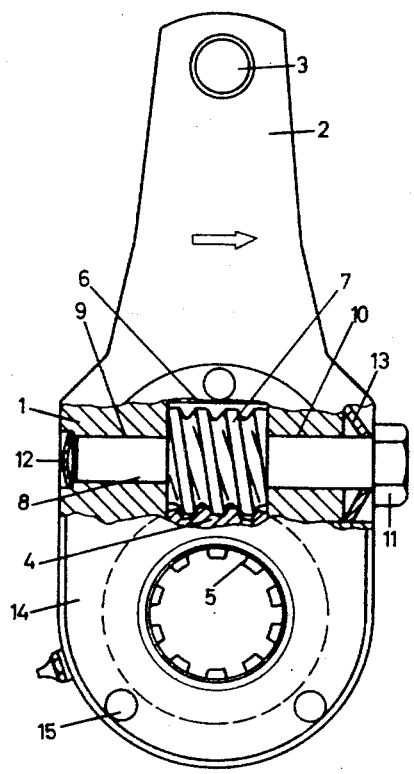

This invention relates to vehicle brake linkage slack-adjusters, and more particularly, to the kind of slack adjusters comprising a brake arm which forms a member of a brake linkage which is mounted for rocking about the axis of a shaft for applying or releasing the brake. In these linkages force is transmitted between the brake arm and the shaft by means of a worm gear mounted for rotation in the brake arm and meshing with a worm wheel mounted on and secured against rotation relative to the shaft, so that the slack in a brake linkage may be adjusted by rotating the worm to alter the position of the worm wheel and the shaft relative to the brake arm. In a slack-adjuster of the kind referred to, it is usual to make provision for manual rotation of the worm, but additionally or alternatively there may be means for rotating the worm automatically for maintaining the slack within predetermined limits, and the said shaft is usually a brake-actuating cam shaft.

Slack-adjusters of the kind referred to are often incorporated in the brake linkages of heavy road vehicles, and for economic reasons there is a tendency towards building vehicles for carrying greater loads.

Hitherto in a slack-adjuster of the kind referred to, the worm and the worm wheel have been made so that each is symmetrical about a plane containing and radial to the axis of the said shaft and perpendicular to the worm axis. This has had the advantages of simplifying manufacture and of allowing such slack-adjusters of a single pattern to be used on either the right-hand side or the left-hand side of a vehicle.

However, with the occurrence of increased vehicle and axle loads, it has become necessary to increase the braking force to be transmitted by the worm and the worm wheel. As the space under the vehicle is often limited, it is desired to increase the capacity of a slack-adjuster for transmitting force without increase in the outer dimensions of the slack-adjuster and without changing the gear ratio. A conventional way of meeting this requirement is to establish contact between a greater number of teeth on the worm wheel and the worm by shaping the worm so that it is increasing diameter with increasing distance from its central plane of symmetry. However, such a worm is expensive and more difficult to manufacture.

The present invention is therefore intended to provide an improved slack-adjuster of the kind referred to which is capable of transmitting larger brake forces but is not unduly expensive to manufacture nor is of greater external dimensions that conventional slack-adjusters.

According to the present invention, a slack-adjuster of the kind referred to is characterized in that the meshing teeth on the worm gear and the worm wheel as viewed in a plane of section containing the axis of the worm and perpendicular to the axis of the shaft rotated by the worm have unsymmetric profiles. The adjacent flank surfaces of the teeth respectively on the worm gear and worm wheel which are in contact when the slack-adjuster is transmitting brake force from a smaller angle between the straight line in said plane and perpendicular to the worm axis and the straight line through the center of the worm wheel than the adjacent flank surfaces of said teeth which are in contact when the slack-adjuster is not transmitting brake force. Further and optional features of the invention appear from the following description and are set forth in the appended claims.

Figure 2:
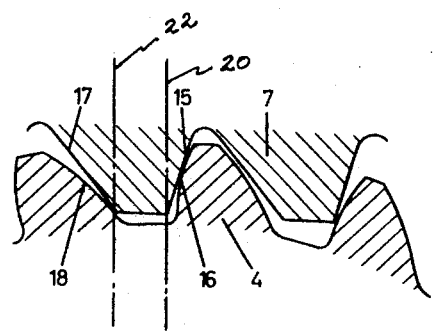

The invention is illustrated by way of example in the accompanying drawings, in which:

FIGURE 1 shows a slack-adjuster provided by the invention, partially in vertical section, and FIGURE 2 is a detail section view showing the profiles of the meshing teeth of the worm gear and worm wheel in a plane of section containing the axis of the worm gear and perpendicular to the axis of the worm wheel to a large scale.

The illustrated slack-adjuster comprises a brake arm adapted to form a member of a vehicle brake linkage, having a body portion 1 and an extending arm portion 2 provided with an opening 3 for pivotal connection to a brake-actuating rod (not shown). The body portion 1 is provided with a circular opening to accommodate a worm wheel 4 rotatably mounted therein. The worm wheel 4 is provided with internal splines 5 for connection in conventional manner with a brake-operating cam shaft (not shown) on which the worm wheel 4 is mounted and secured against relative rotation. The brake arm portion 2 is mounted for rocking about the axis of the cam shaft, and serves to partially rotate the cam shaft about its axis for applying or releasing the brake.

The body portion 1 is also provided with a slot 6 accommodating a worm gear 7 which is in constant mesh with the worm wheel 4. The worm gear 7 is rigidly secured to a shaft 8 journaled for rotation in bores 9 and 10 formed in the body portion 1.

One end of the shaft 8 extends out of the body portion 1 and is formed with a polygon-shaped head 11 for the application of a wrench or other tool to manually rotate the shaft 8. Rotation of the shaft 8 and the worm gear 7 in turn rotates the worm wheel 4 relative to the body portion 1 for the purpose of adjusting the position of the worm wheel 4 and the brake-actuating cam shaft with respect to the brake arm and the brake-actuating rod which is connected to the extending portion 2 of the brake arm. In this manner any slack or clearance in the brake linkage may be readily eliminated or brought within suitable limits.

Sealing washers 12 and 13 serve to prevent the entrance of dirt and water into the bores 9 and 10. Sheet metal plates 14 are fitted to each side of the body portion 1 and are held in assembled relation by means of rivets 15 extending into or through openings in the body portion 1.

As will be seen in FIGURE 2 from the sectionally shown part of FIGURE 1, the meshing teeth on the worm gear 7 and the worm wheel 4 have unsymmetric profiles.

The term "teeth" as used herein means the helical or screw-thread-like projection on the worm gear and the complementary projections on the worm wheel. As shown the worm gear 7 has a single-start helical tooth which is preferred, but multi-start teeth could be used. In the drawing, the parts shown in section are illustrated as viewed in a plane of section containing the axis of rotation of the worm gear 7 and perpendicular to the axis of rotation of the worm wheel 4. The parts in FIGURE 2 are shown in the positions of contact which occur when the slack-adjuster is transmitting brake force. During the application of the brake the brake arm 2 is moved in the direction indicated by the arrow, and thus a flank surface 15 of a tooth on the worm gear 7 will engage a flank surface 16 of a tooth on the worm wheel 4. As will be seen straight tangential lines to these two flank surfaces 15 and 16 at the point of contact form an angle preferably of between 13 and 17 degrees with a plane 20 perpendicular to the axis of the worm shaft 8 extending through the axis of the brake-operating cam shaft. Such a small angle avoids the creation of undesired substantial forces tending to wedge the worm gear 7 and the worm wheel 4 away from each other when the slack-adjuster is transmitting a large brake force.

FIGURE 2 is fashioned to show the adjacent tooth flank surfaces 17, 18 of respectively, the worm gear 7 and the worm wheel 4 which are in contact when the slack-adjuster is not transmitting braking forces. As will be seen and understood, the last-mentioned surfaces 17 and 18 form a substantially greater profile angle with a plane 22 perpendicular to the axis of the worm gear 7, this angle being preferably between 37 and 43 degrees. Thus, with the illustrated slack-adjuster the brake force which can be transmitted may be substantially increased (as compared with a conventional slack-adjuster having symmetrically-profiled worm gears) without risk of breaking off the teeth on the worm gear 7 and the worm wheel 4. The increase in capacity for transmitting brake force will, in the present case, amount of about 50% without increasing the outer dimensions of the worm gear 7 and the worm wheel 4. Although in the brake-releasing direction, the force-transmitting capacity is decreased because of the wedging action which arises from the angle of the surfaces 17 and 18, this is not disadvantageous since the brake-releasing forces are not large.

Having therefore described the nature of the invention and a particular embodiment, those features of novelty believed descriptive of the spirit and scope of the invention are defined with particularity in the appended claims.

What is claimed is:

1. A slack-adjuster comprising a worm wheel, and a worm gear fixed in an arm for coupling in a brake linkage to rock about said worm wheel axis and rotate the worm wheel by engagement of teeth on the worm gear with the teeth on the worm wheel, characterized in that the meshing teeth on the worm gear and the worm wheel as viewed in a plane of section containing the axis of the worm gear and perpendicular to the axis of the said worm wheel have unsymmetric profiles fashioned such that the adjacent flank surfaces of said teeth which are in contact when the slack-adjuster is transmitting brake force form a smaller angle with a straight line in said plane perpendicular to the worm axis extending through the center of the worm wheel than the adjacent flank surfaces of said teeth which are in contact when the slack-adjuster is not transmitting brake force.

2. A slack-adjuster according to claim 1, wherein the said flank surfaces which are in contact when the slack-adjuster is transmitting brake force form an angle of between 13 and 17 degrees with said plane perpendicular to the axis of the worm.

3. A slack-adjuster according to claim 1, wherein the said flank surfaces which are in contact when the slack-adjuster is not transmitting brake force form an angle of between 37 and 43 degrees with said plane perpendicular to the axis of the worm.

References Cited

UNITED STATES PATENTS

| 1,683,163 | 9/1928 | Cone _____ 74—458 |
| 2,338,367 | 1/1944 | Trbojevich _____ 74—458 |
| 3,084,567 | 4/1963 | Fitch et al. _____74—599 |
| 3,255,641 | 6/1966 | Russell _____ 74—599 |
| 3,361,230 | 1/1968 | Hildebrand et al. |

LEONARD H. GERIN, *Primary Examiner.*

U.S. Cl. X.R.

74—458; 188—79.5